United States Patent [19]

Kruse

[11] 4,206,293

[45] Jun. 3, 1980

[54] METHOD FOR PREPARING ABS TYPE RESIN

[75] Inventor: Robert L. Kruse, Springfield, Mass.

[73] Assignee: Monsanto Company, St. Louis, Mo.

[21] Appl. No.: 924,772

[22] Filed: Jul. 14, 1978

[51] Int. Cl.² ............................................. C08F 279/04
[52] U.S. Cl. ..................................... 525/243; 525/383
[58] Field of Search ....................... 260/880 R; 526/53; 525/243

[56] References Cited

U.S. PATENT DOCUMENTS

| | | | |
|---|---|---|---|
| 3,040,012 | 6/1962 | Maeder | 526/92 |
| 3,950,455 | 4/1976 | Okamoto et al. | 260/880 R |
| 3,957,912 | 5/1976 | Cincera | 260/880 R |

*Primary Examiner*—William F. Hamrock
*Attorney, Agent, or Firm*—Joseph S. Nelson; William J. Farrington; Edward P. Grattan

[57] ABSTRACT

This invention relates to an improved process for preparing ABS resins wherein a alkadiene rubber is grafted in aqueous emulsion with styrene and nitrile type monomers, forming a grafted rubber, extracting said grafted rubber into a monomer phase and separating said monomer-grafted rubber phase from said aqueous phase followed by mass polymerizing said grafted rubber-monomer phase to form an ABS polyblend, wherein the improvement comprises, carrying out the mass polymerization of said monomers in the presence of sufficient carbon dioxide to provide an ABS resin having a substantially white color.

20 Claims, No Drawings

METHOD FOR PREPARING ABS TYPE RESIN

BACKGROUND OF THE INVENTION

In the commercial production of rubber modified resins of the type wherein rubber particles of alkadiene rubber grafted with a styrene-type monomer and acrylonitrile-type monomer are generally uniformly dispersed in a matrix of a copolymer of styrene-type monomer and acrylonitrile-type monomer, which resins are commonly called ABS resins, it has heretofore been a common commercial practice to use either suspension or emulsion polymerization procedures for the preparation thereof. A given product resin is produced either as a result of a single batch polymerization or as a result of several batch polymerization followed by a physical blending procedure involving mixture of preformed graft copolymers with other graft copolymers or with ungrafted copolymer. Because of the inherent cost, complexity and sensitivity associated with such manufacturing technology, the art has recently been attempting to develop different techniques which would permit one to manufacture such resins using cheaper, less complex, highly reliable procedures and equipment. A particularly promising different technique would involve the use of mass polymerization which avoids such problems as product separation and recovery from the water used for suspension or emulsion polymerization.

To prepare ABS resins by all-mass polymerization technology has been heretofore proposed, but the practical realization of such a manufacturing route on a commercial scale is full of problems because of the difficulties of producing a product resin which is cheap enough to be competitive and still has the necessary and desirable physical properties for molding and extruding and for formed, manufactured product applications. Because of these difficulties, the art has combined some of the mass polymerization technology with some of the emulsion and/or suspension technology in an overall process.

U.S. Pat. No. 3,950,455 and U.S. Pat. No. 3,957,912 have disclosed such hybrid processes wherein the rubbers are grafted in aqueous emulsion as grafted crosslinked rubber particles and extracted from the aqueous phase by monomers into a monomer phase having said grafted rubber particles. The monomer phase is then separated from the aqueous phase and mass polymerized to an ABS resin.

Various methods have been used to control the color of such resins such as antioxidants and the like or closer control of the styrene and acrylonitrile monomer compositions during polymerization to control compositional drift leading to color chromophones in the resin. Such methods have proven costly and difficult to control.

It has now been discovered unexpectedly that chromophoric development during the mass polymerization of monovinylidene aromatic monomers and alkenenitrile monomers having a dispersed alkadiene rubber grafted with said monomers dispersed therein can be deinhitied by carrying the mass polymerization in the presence of sufficient carbon dioxide to provide an ABS resin having a substantially white color.

SUMMARY OF THE INVENTION

The present invention relates to an improved process for production of ABS resin wherein particles of an alkadiene rubber grafted with monovinylidene aromatic and alkenentrile monomers are dispersed in a matrix copolymer of a monovinylidene aromatic monomer and an alkenentrile monomer which comprises:

a. grafting by aqueous emulsion graft polymerization an alkadiene rubber with a monovinylidene aromatic monomer and an alkenenitrile monomer to produce grafted rubber particles in an aqueous latex, b. mixing with said latex from 30 to 400 parts per hundred parts of latex solids by weight of at least one monoethylenically unsaturated monomer selected from the group consisting of monovinylidene aromatic monomers and alkenenitrile monomers, c. extracting said grafted rubber latex particles from said aqueous latex into the monomer forming a dispersion of said particles in the monomer phase, said aqueous latex forming a separate free water phase, d. separating said free water phase from monomer phase, e. subjecting said grafted rubber particles dispersed in said monomer phase to mass polymerization conditions to produce an ABS resin composition comprising said alkadiene grafted rubber particles dispersed in said matrix copolymer and unreacted monomers as a melt, and f. devolatilizing said ABS resin composition melt so as to remove said unreacted monomers providing an ABS resin product comprising said matrix copolymer having said grafted rubber particles dispersed therein, the improvement comprising carrying out the mass polymerization of said monomer phase in step (e) in the presence of sufficient carbon dioxide to provide an ABS resin product having a substantially white color.

DESCRIPTION OF THE PREFERRED EMBODIMENTS

As discussed above the production of ABS and related rubber modified resins requires the production of a copolymer grafted rubber from an initial rubber latex. For the purposes of the present invention, the graft rubber copolymer is produced by polymerizing the superstrate monomers in the presence of the preformed rubber substrate under emulsions conditions. In such a graft polymer system, it is generally not possible to separate any ungrafted rubber from the polymerized (grafted) rubber, and the amount of ungrafted rubber is usually very small, i.e., less than 2% and preferably less than 0.5%, by weight based on total graft rubber copolymer weight. Also, since 100% grafting efficiency of superstrate monomers to rubber substrate normally is approached only at very low weight ratios of monomers to substrate at least a portion of the monomers polymerized in the presence of the preformed rubber substrate will not chemically combine therewith so as to provide a graft copolymer product. This non-combined copolymer portion may be increased or decreased depending upon the ratio of monomers to rubber, the particular monomer starting formulation, the nature of the rubber, the conditions of polymerization and the like, as those skilled in the art appreciate. Hence, a graft copolymer composition typically contains some amount of a second (ungrafted) copolymer of monovinylidene aromatic monomer and alkenenitrile monomer by reason of available methods of making a graft copolymer for use in the practice of the present invention. In general, any of the known emulsion graft polymerization processes may be used to accomplish graft polymerization of the superstrate monomers to the preformed elastomer alkadiene substrate. Such techniques are generally well known to those skilled in the art.

Various alkadiene rubbers may be employed as a substrate, including conjugated 1,3-diene rubbers, ethylenepropylenediene terpolymer rubbers, acrylate-diene copolymer rubbers and mixtures thereof. It is now preferred to include at least about 50 weight percent of a conjugated alkadiene component in an elastomer used to make starting compositions for use in this invention.

Preferred substrate rubbers are alkadiene rubbers or mixtures of alkadiene rubbers composed of at least 75 weight percent based on total rubber monomers, such as rubbery polymers having a second order transition temperature not higher than about 0° C., and preferably, not higher than about −20° C. Examples of such conjugated 1,3-dienes include butadiene, isoprene, piperylene, chloroprene and the like. Such rubbers include homopolymers of conjugated 1,3-dienes and interpolymers of such 1,3-dienes with one or more copolymerizable monoethylenically unsaturated monomers, for example monovinylidene aromatic hydrocarbons such as styrene and aralkyl styrenes, and the like; and alpha-alkyl-styrenes, such as alphamethyl styrene, alpha-ethyl styrene, etc.: vinyl naphthalene, etc.; arhalo monovinylidene aromatic hydrocarbons, such as the chlorostyrenes, 2,4-dibromo-styrene, etc.; acrylonitrile; methacrylonitrile; alkyl acrylates and alkyl methacrylates, acrylamides, unsaturated ketones, such as vinyl methyl ketone, methyl isopropenyl ketone, etc.; alphaolefins such as ethylene, propylene, etc.; pyridines; vinyl esters, such as vinyl acetate, vinyl stearate, etc.; vinyl and vinylidene halides and the like.

The rubber may contain up to about 2% of a crosslinking agent based on the weight of the rubber-forming monomer or monomers. The crosslinking agent can be any of the agents conventionally employed for crosslinking diene rubbers, e.g., divinyl benzene, diallyl maleate, diallyl fumarate, diallyl adipate, allyl acrylate, allyl methacrylate, diacrylates and dimethacrylates of polyhydric alcohols, e.g., ethylene glycol dimethacrylate, etc.

A preferred group of rubbers are those consisting of from about 75 to 100% by weight of alkadiene monomers and from about 0 to 25% by weight of a monomer selected from the group consisting of monovinylidene aromatic hydrocarbons, e.g., styrene and unsaturated nitrile, e.g., acrylonitrile or mixtures thereof. Particularly advantageous rubber substrates are butadiene homopolymer or a copolymer of 90 to 95% by weight butadiene and 5 to 10 weight percent of acrylonitrile or styrene.

Emulsion polymerization is preferred over mass or suspension polymerization for polymerizing rubber monomers since such will provide a particle size which is preferred for use in the present invention. Furthermore, emulsion polymerization of rubber monomers produces a latex which is useful as a base or starting point for subsequent emulsion polymerization of the superstrate monomers onto the preformed rubber in the preparation of the graft rubber copolymer.

The graft copolymers may be prepared by polymerizing superstrate monomers in the presence of the preformed rubber substrate, generally in accordance with conventional emulsion graft polymerization techniques.

The preferred processes use an emulsion technique to obtain the particle size of not more than about 0.8 microns for the graft polymer which is preferred for use in the practice of the present invention. In such graft polymerization, a preformed rubber substrate latex generally is mixed with the desired monomers and this admixture is polymerized to combine chemically or graft a portion of the superstrate monomers upon the rubber substrate. Depending upon the ratio of monomers to rubber substrate and polymerization conditions, it is possible to regulate both the desired degree of grafting of the superstrate monomers onto the rubber substrate and the polymerization of ungrafted matrix copolymer. The ratio of monomers to rubber charged to the graft polymerization reaction zone is a primary determinant of the superstrate:substrate ratio of the resultant graft copolymer, although conditions of polymerization, rubber chemistry and particle size, rates of monomer addition, chain transfer agents, etc., may also exert an effect.

A polymerization catalyst is generally included and the amount used is generally within the range of from about 0.001 to 3.0 weight percent and preferably from about 0.005 to 0.5 weight percent of the total polymerizable material, the exact amount depending upon the monomers and the desired polymerization cycle.

As is well known, it is often desireable to incorporate molecular weight regulators such as mercaptans, halides and terpenes in relatively small percentages by weight, on the order of from about 0.001 to 2.5% by weight of the polymerizable material. In addition, it may be desirable to include relatively small amounts of antioxidants or stabilizers, such as the conventional alkylated phenols and the like, although these may be added during or after polymerization.

In the emulsion polymerization grafting process, the monomers and rubber substrate are stabilized in water by use of suitable emulsifying agents, such as fatty acid soaps, alkali metal or ammonium soaps of high molecular weight, alkali or alkaryl sulfates and sulfonates, mineral acid salts of long chain aliphatic amines, etc. Emulsifying agents which have proven particularly advantageous are ammonium oleate, sodium palmitate, sodium stearate and other sodium soaps. Generally, the emulsifying agent is provided in amounts of from about 0.1 to 15 parts by weight per 100 parts by weight of the monomers and water is provided in an amount of from about 1 to 4 parts per part of monomers and even in larger ratios where greater dilution is desirable, as those skilled in the art appreciate.

If desired, an aqueous latex formed in the emulsion polymerization of the rubber substrate may provide the aqueous medium onto which the monomers are grafted with or without the addition of further emulsifying agents, water and the like. Various water soluble free radical polymerization initiators are conventionally used for emulsion polymerization of the rubber monomer, including conventional peroxy and azo catalysts and the resulting latex may be used as the aqueous medium in which the graft copolymer monomers are admixed. In this manner, the catalyst for the rubber polymerization may function in whole or part as the catalyst for the graft polymerization. However, additional catalysts may be added at this time of graft polymerization.

Typical emulsion polymerization conditions involve termperatures in the range of from about 20° to 100° C. with agitation and preferably an inert atmosphere. Pressures of from about 1 to 100 pounds per square inch may be employed and monomers and/or additional catalysts may be added incrementally or continuously over a portion of the reaction cycle. Polymerization is preferably continued until substantially all, that is more than 90%, of the monomers have polymerized. The remaining monomers and other volatile components can be distilled away from the latex, if desired, but preferably are allowed to remain in the latex, which is ready for further treatment.

In addition to varying the polymerization conditions, the particle size of the emulsion latex graft particles may also be varied by seeding, agitation, rubber size variation through agglomeration prior to grafting, coagulation techniques, etc. The preferred agglomeration procedures are provided by Dalton's U.S. Pat. Nos. 3,558,541 and 3,551,370.

The particle size of the rubber has an effect upon the optimum grafting level for a graft copolymer. For example, a given weight percentage of smaller size rubber particles will provide considerable higher surface area for grafting than the equivalent weight of a larger size rubber particle. Accordingly, the density of grafting can be varied depending upon the size of the rubber particle. Generally, the smaller graft polymer particles will tolerate a higher superstrate/substrate ratio than the larger size particles.

The particle size of the rubber graft copolymer has a significant effect upon the gloss and physical properties of the product produced by the processes of this invention. Typically, the particle size of the graft copolymers used in the practice of the present invention may be varied from as little as about 0.01 micron to as much as about 5.0 microns and preferably, from about 0.25 to 2.0 microns, depending upon the ultimate properties desired for a given product. Preferred rubber graft copolymers for use in the practice of this invention are those having a weight average particle size of from about 0.3 to 0.8 microns and more preferably from about 0.03 to 0.6 microns as determined by known means such as measurement from a photomicrograph, light scattering or other known tests.

For emulsion polymerization processes, the rubber desirably has a significant degree of crosslinking. With respect to the graft copolymers, at least some degree of cross-linking of the rubber is inherent during the graft polymerization process and this desirably may be augmented through the addition of crosslinking agents or control of the polymerization conditions.

Various ABS type resins may be produced by the process of this invention employing different starting graft rubber latices, mixtures of such latices or latices containing more than one size graft rubber particles. Examples of classes of ABS type resins producible by the teachings of this invention include resins having relatively monodisperse particle size distributions, resins having two particle sizes where one is a small particle and one is a large particle, resins where there is a graft particle component which is polydisperse in particle size distribution would be such that the weight average particle size ranges from about 0.01 to 5.0 microns, preferably from about 0.20 to about 2.0 microns, with the most preferred range being from 0.3 to 0.8 microns. Also, the rubber graft may be used on a low graft small particle rubber where the low graft particles cluster to form the large particles in the final polymer product.

For example, specifically useful latices and mixtures of latices include those of monodisperse relatively large size particles of from about 0.3 to 0.8 microns grafted to a graft superstrate level of from 30–80 parts per 100 parts substrate rubber wherein the particle size is monomodal and sharp, obtained by emulsion polymerization directly or by agglomeration to the desired size and also polydisperse relatively larger size particles across a range of sizes from 0.3 to 0.8 microns grafted to the same graft level and obtained by emulsion polymerization and staged agglomeration to produce the polydispersity of sizes. Also, for example, such latices and mixtures include mixed latices of relatively large particle sizes of polydisperse size range as above but with a graft level of 15–40 parts per 100 parts substrate together with a latex of relatively small size, high graft level particles of from 0.05–0.3 microns and a graft level of 40–100 parts per 100 parts substrate and mixed latices of a relatively large monodisperse particle of 0.3 to 2.0 microns and a low graft level of from 15–40 parts per 100 parts substrate together with the same high graft level, small size particle latex as above. Also, useful latex mixtures include, for example, those of mixed high graft level and low graft level small particles of 0.05 to 0.3 microns some with a graft level of 40–100 parts per 100 parts substrate and some with a graft level of only 10–40 parts per 100 parts substrate wherein the latex particles will agglomerate to a size of from 0.2 to 2.0 microns in the final ABS resin as a result of shear and working in the continuous mass polymerization reaction and devolatization stages.

The grafted rubber particles are contained in an aqueous latex in amounts of 25 to 65% by weight of the emulsion preferably 30 to 55%. The grafted rubber particles are readily removed from the aqueous latex by mixing with at least one monoethylenically unsaturated monomer selected from the group consisting of monovinylidene aromatic monomers and alkenenitrile monomers, e.g., styrene and acrylonitrile monomers. About 30 to 400 parts of monomer are used per hundred parts of latex solids (grafted rubber particles). The rubber particles are extracted into the monomers as a monomer phase with the residual aqueous latex forming a separate free water phase.

The free water phase is readily separated from the monomer phase by decantation, extrusion, centrifugation or other mechanical means. About 30 to 100 parts of monomers per 100 parts of grafted rubber particles provides stiff to soft pastes of the monomer phase that are readily separated and processed through extrusion type means such as disclosed in U.S. Pat. No. 3,859,217 which will compress the paste allowing the residual water phase to separate as a first stream and the monomer phase as a second stream. The monomer phase can be further diluted with said monovinylidene aromatic and alkenenitrile monomers to adjust the rubber moiety of the monomer phase polymerized so that about 3 to 50% by weight is present in the ABS resin product.

If 100 to 400 parts of monomer per 100 parts of grafted rubber are used the monomer phase is a liquid and is readily separated from the water phase by decantation or centrifugation. The monomer phase may be adjusted with additional monomers to provide the desired rubber content and monomer compositions.

The monomer phase is then subjected to mass polymerization to form an ABS resin having said grafted rubber particles dispersed in a matrix copolymer. Residual unreacted monomer is removed by devolatization by conventional means wherein the melt from the mass polymerization comprising the matrix polymer, dispersed grafted rubber particles and residual monomers is heated to about 180° to 250° C. and the residual monomers flashed off at subatmospheric pressures either by conventional extrusion or in flash tanks by falling strand devolatilization. A suitable process for devolatilization is that using at least one stage of wiped film devolatilization as disclosed in U.S. Pat. No. 3,797,550.

The ABS resins of the present invention can have a monovinyl aromatic monomer to alkenenitrile monomer weight ratio of 80:20 to 20:80 in both the graft copolymer and matrix copolymer with the monomer composition of the matrix phase generally being about the same as the graft copolymer. The ABS resins having a rubber moiety content ranging from 3 to 50% depending on the physical properties desired.

The extraction of the grafted rubber particles into the monomer phase can be carried out with monomers containing at least one saturated solvent for the graft copolymer. The use of said solvents lower the viscosity of the monomer phase, having dispersed grafted polymers therein, allowing more rubber to be present during mass polymerization.

The saturated solvents can have boiling point of 25° to 250° C. and is present in said monomers in an amount of about 10 to 40% by weight of said monomers and solvent.

The saturated solvents are selected from the group consisting of nitriles, hydrocarbons, halogenated hydrocarbons, lower carboxylic esters, cyclic ethers, formamides and acetamides as described in U.S. Pat. No. 3,957,912 and is hereby incorporated by reference.

The mass polymerization of the monomer phase with or without added monomers is carried out in known manner by employing any known mass polymerization reaction equipment or vessels. Preferably, such mass polymerization is a thermal polymerization conducted in any of the known polymerization vessels adapted for removal of the unreacted monomers and solvents in vapor form. Most preferably, the thermal mass polymerization reaction is conducted with close control of the reaction temperature by means of removal of the monomer vapor from the reaction vessel. Any temperature controlled polymerization reaction equipment from which monomer vapor can be removed can be employed for the preferred mass polymerization step including stirred tank reactors, horizontal stirred cylindrical reactors and other such reactors.

The mass polymerization reaction can be controlled by varying the nature and amounts of the feed streams thereto and the conditions thereof to produce the desired ABS resin product. As is well known, it is often desirable to incorporate molecular weight regulators or chain transfer agents into the polymerization of the matrix copolymer in relatively small quantities. Such chain transfer agents as mercaptans, halides and terpenes can be added in amounts of from 0.001 to 2.0% by weight if desired. The product will consist of a desired matrix copolymer of selected composition, preferably styrene-acrylonitrile, or SAN, copolymer and a dispersion therein of graft rubber particles to produce the desired rubber content. Resins having a rubber moiety content of from 3 to 50 or higher weight percent rubber in the copolymer matrix can be produced. The mass polymerization reaction can be controlled to produce a copolymer solution in unreacted monomers of any desired composition, preferably from about 40 to 75% by weight copolymer solids in unreacted monomers. The product of the preferred thermal mass polymerization reaction in generally in the form of a hot melt of such composition at a temperature of from about 130° to 200° C. depending upon the polymerization temperature conditions.

The hot melt product of mass polymerization is continuously removed from the reactor and thereafter subjected to one or more stages of devolatilization to remove the remaining unreacted monomers and saturated solvent of use and remaining traces of water therefrom. Such devolatilization is conducted in known manner in any desired devolatilizer, either of the wiped film or falling strand type. The devolatilization treatment is generally conducted at temperatures of from about 140° to 280° C. at reduced pressures of from 0.01 to 800 mmHg absolute, preferably at from about 180° to 260° C. and at pressures at from 2 to 200 mm abs. The product of the devolatilization stage is the resin product composition substantially freed of free or unreacted monomers as well as solvent and water. Such free or residual monomer level is reduced to less than 1.0% by weight and desirably to less than 0.4% by weight.

The improved process of the present invention comprises carrying out the mass polymerization of said monomer phase having said dispersed grafted rubber particles dispersed therein in the presence of sufficient carbon dioxide to provide an ABS resin product having a substantially white color.

The carbon dioxide can be added to said monomer phase prior to polymerization by sparging or purging said monomer phase with carbon dioxide as a gas until essentially saturated with the carbon dioxide followed by continued sparging and/or maintaining a blanket of carbon dioxide gas over said monomer phase at pressures of about 40 to 100 psi during mass polymerization to control the temperature of polymerization at about 130° to 200° C.

Conventionally such mass polymerization systems are purged with nitrogen gas to remove oxygen known to inhibit such reactions. Such nitrogen systems are also used to control pressures in the reactor and control temperatures. In the present invention such sparging and pressure control systems would replace the nitrogen with carbox dioxide. The examples will show that nitrogen purging does not inhibit chromophoric development of yellow to brown color in the ABS resin whereas when purged with carbon dioxide the ABS resins produced are substantially white. The mechanicam by which carbon dioxide inhibits chromophoric devlepment was is not known, hence, it was unexpected that chromophoric development inhibited.

A suitable process adaptable for mass polymerizing the monomer phase having dispersed grafted rubber particles is disclosed in U.S. Pat. No. 3,903,200 and is hereby incorporated by reference. A suitable process for maintaining a blanket and purge of carbon dioxide present during the mass polymerization of said monomer phase is disclosed in U.S. Pat. No. 3,794,471 and is hereby incorporated by reference.

The sparging or purging of the monomer phase can be carried out as hereinbefore described. The operation is based on the concept of dispersing a gas in a liquid described in conventional Chemical Engineering Handbook, e.g., Chemical Engineer's Handbook, Fifth Edition, published by McGraw-Hill Book Company, New York, N. Y. Methods of gas-in-liquid dispersion is disclosed in pages 18–71 through 18–96 under the heading of Methods of Gas Dispersion using sparging, simple bubblers, etc. Perforated-pipe or plate spargers usually have orifices $\frac{1}{8}$ to $\frac{1}{2}$ inches in diameter. Such gas-liquid contacting is conventionally carried out in stirred tanks and stirred reactors by placing the sparge tube below the rotating agitator to gain optimum dispersion throughout the tank and monomer phase.

In the present process carbon dioxide gas is preferably dispersed in the mass polymerization reactor in sufficient amounts to essentially saturate the monomer phase with carbon dioxide. The carbon dioxide has a solubility in the monomer phase and saturates the monomer phase. Additional carbon dioxide then is used to blanket the polymerizing monomer phase and provide an inert gas phase to pressurize the polymerizing phase for temperature control, said pressure being about 40 to 100 psi to control temperature from 130° to 200° C.

RUBBER LATEX PREPARATION—STEP A

A rubber latex was prepared by emulsion polymerizing a monomer formulation of butadiene/acrylonitrile monomer having a monomer ratio of B/AN of 97/3 using about a 1:1 monomer water ratio having 3% Rubber Reserve Soap based on water at temperature of 77° C. with $K_2S_4O_8$ initiator (0.5% by weight based on monomer) providing a latex of about 42% solids of rubber particles having a particle size of about 0.08 microns.

RUBBER LATEX AGGLOMERATION—STEP B

The rubber latex of Step A (2600 gms) was mixed with 780 gms of water containing 26 cc of acetic anhydride and let stand for about 25 minutes at 35° C. The rubber latex agglomerates to a particle size of about 0.7 microns and was stabilized with about 200 gms of an acid-stable emulsifier (dodecyl diphenyl ether sulfonate (10% solution in $H_2O$).

RUBBER LATEX GRAFTING—STEP C

The agglomerated rubber latex of Step B (2600 gms) was grafted with 70 gms of styrene and 30 grams of acrylonitrile as a monomer formulation using 27 grams of a 4% solution of $K_2S_2O_8$ and 27 grams of a 2% solution of potassium bisulfite as a redox initiating system. The grafting was carried out at about 80° C. to about 98% conversion.

GRAFTED LATEX DEWATERING—STEP D

The grafted latex was dewatered by coagulating with $Al_2(SO_4)_3$ (10% solution) followed by treating the system with a 50/50 styrene/acrylonitrile monomer phase to extract the grafted rubber particles into the monomer phase. The water phase was decanted off leaving the monomer/grafted rubber phase as a separate phase.

EXAMPLE 1

The monomer/grafted rubber phase of Step D was dispersed in a monomer formulation wherein the final monomer ratios were 70% by weight of styrene and 30% by weight of acrylonitrile, said monomer formulation containing about 20% by weight of the grafted rubber particles as a polymerizable mixture. The mixture was mass polymerized in a reactor of the type as described in U.S. Pat. No. 3,751,010 at 154° C., and 105 psig to a monomer conversion of about 70%. The polymerizable mixture was purged and saturated with nitrogen gas prior to polymerization being under positve nitrogen pressure during polymerization to control the temperature at about 154° C. The partially polymerized mixture was devolatilized in a vacuum oven at about 30 in. (75 cm) of mercury at 200° C. for 30 minutes reducing the residual monomers to about 0.5% providing an ABS polyblend of about 20% rubber moiety. The ABS resin was molded into flat sheet at 375° C. and tested for color by ASTM Test D-1925. The yellowness index was measured at 76 units.

EXAMPLE 2

Example 1 was repeated wherein the mass polymerization of the monomer-grafted rubber phase was purged and saturated with carbon dioxide prior to polymerization. The monomer/graft polymer phase mixture was found to have a carbon dioxide gas solubility of about 1 cc per 1 gram of mixture at 150° C. and 7.0 Atm. The mass polymerization being carried out under a positive carbon dioxide gas pressure to control temperature. The ABS resin recovered was measured for color and found to have a yellowness index of 42 units substantially lower than the color of the ABS polymerized in a conventional nitrogen atmosphere. Under the ASTM Test D-1925, samples having values of about 40 to 50 are considered substantially white with less than 40 being white. Values ranging from 50 to 70 are considered to be yellow and greater than 70 values are yellow to brown.

DEWATERING WITH MONOMERS AND SOLVENT

Step D was repeated using a monomer extracting phase of 25% acrylonitrile, 50% styrene and 25% propionitrile as a solvent after coagulation with $Al_2(SO_4)_3$. Dewatering was found to be efficient with the aqueous phase of the latex separating into an aqueous phase and the grafted rubber particle being extracted into the monomer phase.

What is claimed is:

1. An improved process for production of ABS resins wherein particles of an alkadiene rubber grafted with monovinylidene aromatic and alkenenitrile monomers are dispersed in a matrix copolymer of a monovinylidene aromatic monomer and an alkenenitrile monomer which comprises:
    a. grafting by aqueous emulsion graft polymerization an alkadiene rubber with a monovinylidene aromatic monomer and an alkenenitrile monomer to produce grafted rubber particles in an aqueous latex,
    b. mixing with said latex from 30 to 400 parts per hundred parts of latex solids by weight of at least one monoethylenically unsaturated monomer selected from the group consisting of monovinylidene aromatic monomers and alkenenitrile monomers,
    c. extracting said grafted rubber latex particles from said aqueous latex into the monomer forming a dispersion of said particles in the monomer phase, said aqueous latex forming a separate free water phase,
    d. separating said free water phase from said monomer phase,
    e. subjecting said grafted rubber particles dispersed in said monomer phase to mass polymerization conditions to produce an ABS resin composition comprising said alkadiene grafted rubber particles dispersed in said matrix copolymer and unreacted monomers as a melt, and
    f. devolatilizing said ABS resin composition melt so as to remove said unreacted monomers providing an ABS resin product comprising said matrix copolymer having said grafted rubber particles dispersed therein, the improvement comprising carrying out the mass polymerization of said monomer phase in step (e) in the presence of sufficient carbon dioxide to provide an ABS resin product having a substantially white color.

2. A process of claim 1 wherein said monovinylidene aromatic monomer is selected from the group consisting of styrene, alphamethyl styrene, chlorostyrene and bromostyrene.

3. A process of claim 1 wherein said alkenenitrile monomer is selected from the group consisting of acrylinitrile and methacrylonitrile.

4. A process of claim 1 wherein said monoethylenically saturated monomers used in step (b) are a mixture of styrene and acrylonitrile, said mixture containing not more than about 50% by weight of styrene.

5. A process of claim 1 wherein said monomer used in step (b) is styrene.

6. A process of claim 1 wherein said monomer used in step (b) is acrylonitrile.

7. A process of claim 1 wherein said monomer phase is adjusted in step (e) with additional monoethylenically unsaturated monomer such that the weight ratio of monoethylenically unsaturated aromatic to alkenyl nitrile monomer is about 80:20 to 20:80.

8. A process of claim 7 wherein said monomer phases is adjusted in step (e) with said aromatic and nitrile monomers such that the rubber moiety of the dispersed rubber particles is present in the ABS resin product formed in step (f) in an amount of 3 to 50% by weight of said ABS resin product.

9. A process of claim 1 wherein said monomer phase is saturated with carbon dioxide under the conditions of polymerization.

10. A process of claim 9 wherein said mass polymerization is carried out at 130° to 200° C. at pressures of 40 to 100 psi.

11. A process of claim 10 wherein said mass polymerization is carried out under continuous mass polymerization conditions in a horizontal stirred flow through reaction being cooled by evaporation of said monomers.

12. A process of claim 1 wherein said grafted rubber latex is coagulated prior to extraction into said monomer.

13. A process of claim 12 wherein said coagulation is carried out by mixing said latex with a sufficient amount of a coagulant selected from the group consisting of acids, salts and polyelectrolytes.

14. A process of claim 13 wherein said salt is aluminum sulfate, sodium chloride or magnesium sulfate.

15. A process of claim 1 wherein said monomers used in step (b) contain at least one saturated solvent for a graft copolymers of said monovinylidene aromatic and alkenyl nitrile monomers.

16. A process of claim 15 wherein said solvent has a boiling point between 25° to 250° C. as is present in said monomers in an amount of about 10 to 40% by weight of said monomers and solvent.

17. A process of claim 16 wherein said solvent is selected from the group consisting of nitriles, hydrocarbons, halogenated hydrocarbons, lower carboxylic esters, cyclic ethers, formamides and acetamides.

18. A process of claim 17 wherein said solvent is propionitrile.

19. A process of claim 15 wherein the graft copolymer is styrene-acrylonitrile.

20. An improved process for production of ABS resins wherein particles of an alkadiene rubber grafted with monovinylidene aromatic and alkenenitrile monomers are dispersed in a matrix copolymer of a monovinylidene aromatic monomer and an alkenenitrile monomer which comprises:

a. grafting by aqueous emulsion graft polymerization an alkadiene rubber with styrene and acrylonitrile to produce grafted rubber particles in an aqueous latex, b. mixing said latex with about 40 to 400 parts of at least one monomer selected from the group consisting of styrene and acrylonitrile, c. extracting said graft rubber particles from said latex into said monomer forming a dispersion of said particles in said monomer as a monomer phase, said aqueous latex forming a free water phase, d. separating said free water phase from said monomer phase, e. subjecting said monomer phase to mass polymerization conditions to produce an ABS resin, and f. devolatilizing said ABS resin so as to remove residual monomer, said improvement comprising, carrying out such mass polymerization in the presence of sufficient carbon dioxide to provide an ABS resin product having a substantially white color.

* * * * *